(12) United States Patent  
Arcos-Rodriguez et al.

(10) Patent No.: US 9,182,894 B1
(45) Date of Patent: Nov. 10, 2015

(54) METHOD AND TERMINAL FOR DISPLAYING INFORMATION ON A SCREEN

(75) Inventors: Luis Arcos-Rodriguez, Munich (ES);
Peter Heinold, Hohenkammer (DE);
Joerg Siewerth, Hohenbrunn (DE);
Klaus-Juergen Werner, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1269 days.

(21) Appl. No.: 10/031,227

(22) PCT Filed: Jul. 19, 2000

(86) PCT No.: PCT/DE00/02360
§ 371 (c)(1),
(2), (4) Date: May 6, 2002

(87) PCT Pub. No.: WO01/07998
PCT Pub. Date: Feb. 1, 2001

(30) Foreign Application Priority Data

Jul. 22, 1999 (DE) .................................. 199 34 506

(51) Int. Cl.
*G06F 3/048* (2013.01)
*G06F 3/0484* (2013.01)
*G06F 3/0482* (2013.01)
*G06F 3/00* (2006.01)

(52) U.S. Cl.
CPC .......... *G06F 3/04842* (2013.01); *G06F 3/0482* (2013.01)

(58) Field of Classification Search
CPC .......... G06F 3/00; G06F 3/048; G06F 3/0481
USPC .................. 715/733, 805, 513, 700, 714, 748
See application file for complete search history.

(56) References Cited

U.S. PATENT DOCUMENTS

| | | | |
|---|---|---|---|
| 5,656,804 A * | 8/1997 | Barkan et al. | 235/472.01 |
| 5,710,897 A | 1/1998 | Schneider | |
| 5,887,133 A | 3/1999 | Brown et al. | |
| 6,011,537 A * | 1/2000 | Slotznick | 715/733 |
| 6,300,947 B1 * | 10/2001 | Kanevsky | 715/866 |
| 6,304,259 B1 * | 10/2001 | DeStefano | 715/805 |
| 6,374,145 B1 * | 4/2002 | Lignoul | 700/17 |
| 6,605,120 B1 * | 8/2003 | Fields et al. | 715/513 |
| 6,687,737 B2 * | 2/2004 | Landsman et al. | 709/203 |

FOREIGN PATENT DOCUMENTS

| | | |
|---|---|---|
| WO | WO 99/00723 | 1/1999 |
| WO | WO 99/52032 | 10/1999 |

OTHER PUBLICATIONS

XP-002143554; "Web-Page Filtering and Re-Authoring for Mobile Users" by Timothy Bickmore et al.; *The Computer Journal*, vol. 42, No. 6, c.1999.

* cited by examiner

*Primary Examiner* — Nicholas Augustine
(74) *Attorney, Agent, or Firm* — Slayden Grubert Beard PLLC

(57) ABSTRACT

In a method for displaying information on a screen, information configured as a first element and a second element, in a separate space from the latter, for simultaneous display on the same screen page is supplied. The first element and the second element are separated from one another again in a second step and are then displayed on a screen at separate times.

18 Claims, 3 Drawing Sheets

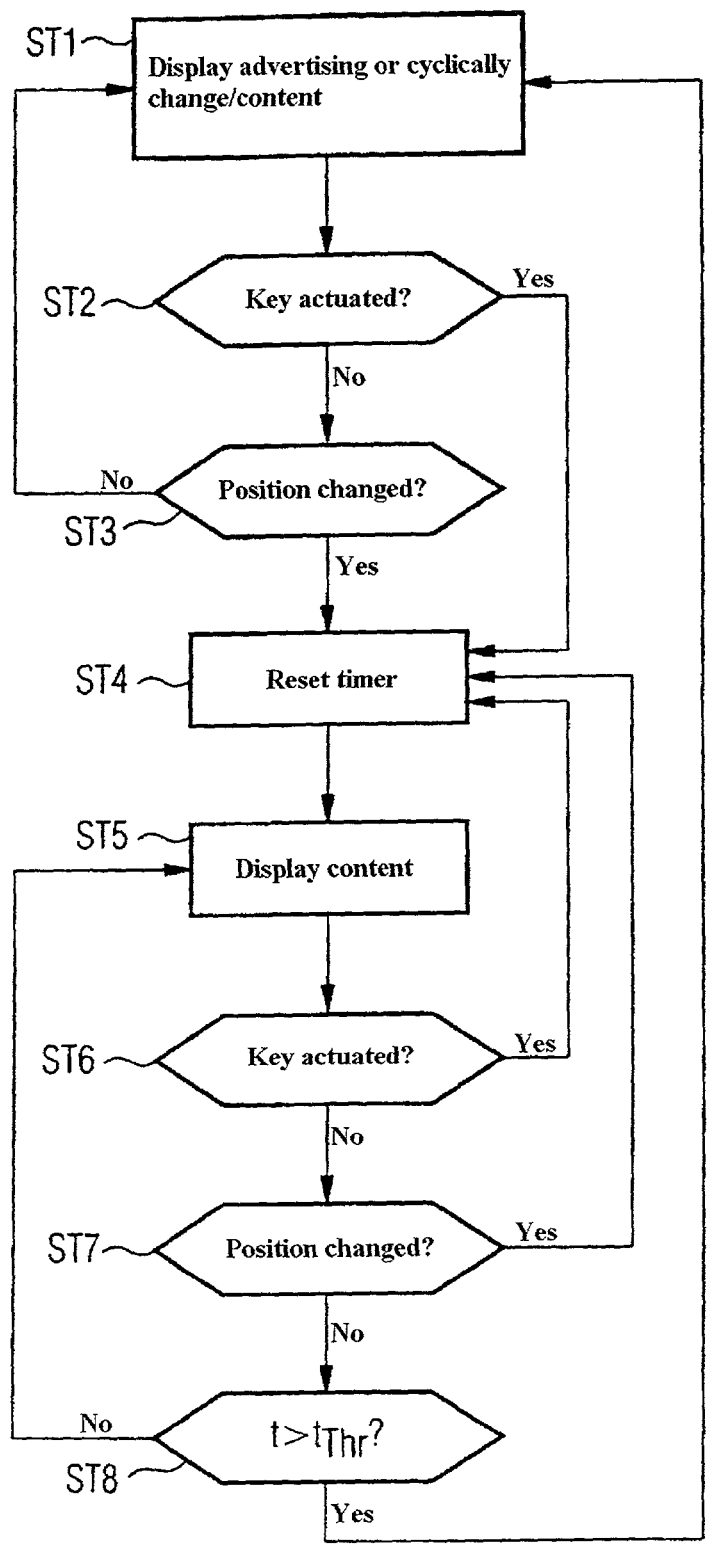

METHOD AND TERMINAL FOR DISPLAYING INFORMATION ON A SCREEN

CLAIM FOR PRIORITY

This application claims priority to International Application No. PCT/DE00/02360 which was published in the German language on Jul. 19, 2000.

TECHNICAL FIELD OF THE INVENTION

The present invention relates to a method for displaying information on a screen and to a terminal for a network.

BACKGROUND OF THE INVENTION

The prior art uses programming to detect advertising banners automatically and to modify the display of the Internet page as appropriate, such that there is only content information and no longer advertising appearing on the screen page. This technology is available, by way of example, from Siemens AG under the keyword "Web-Washer". This "Web-Washer" is a supplementary program for an Internet browser which can speed up navigation on the Internet. This software runs on PC and server. It automatically removes advertising from web pages which are retrieved. Pop-up windows, animated images and the like are automatically filtered, so that web pages are loaded more quickly and bandwidth can be saved on the network.

Normal Internet pages are also configured for display on a PC monitor. That is, on a monitor having a screen diagonal of 14" or 15", for example. However, there is also a trend for displaying Internet pages, for example, on much smaller screens. By way of example, one practice known to have started is that of displaying Internet pages on the display of a mobile radio, such as a GSM telephone, which has the function of a terminal for the Internet network. An example of a GSM telephone having an Internet browser function is, by way of example, the mobile telephone available from and sold by the company Nokia under the name "Communicator". With a display as small as in mobile radios, for example, the display becomes overloaded and possibly even illegible when advertising banners and content information are displayed in a separate space but simultaneously.

SUMMARY OF THE INVENTION

In one embodiment of the invention, there is a method for displaying information on a screen. The method includes, for example, supplying information configured as a first element and a second element, the first element configured in a separate space from the second element, for simultaneous display on the same screen page, separating the first element and the second element, and displaying the first element and the second element on a screen at separate times.

In another aspect of the invention, the information is supplied from a network.

In another aspect of the invention, the first element is advertising information.

In yet another aspect of the invention, the display changes between the first element and the second element whenever a predetermined time period has elapsed.

In another aspect of the invention, the display changes between the first element and the second element depending on a change of state on a terminal associated with the screen.

In another aspect of the invention, the display changes between the first element and the second element depending on at least one of actuation of a key associated with the terminal, a change in the position of the terminal and actuation of a touch screen.

In still another aspect of the invention, after the display has changed depending on a change of state, no further change takes place during a predetermined time period.

In another embodiment of the invention there is a terminal for a network. The terminal includes, for example, a screen and a control unit which controls the display on the screen, where information configured as a first element and a second element, the first element configured in a separate space from the second element, for simultaneous display on the same screen page is supplied to the control unit, the control unit separating the first and second elements from one another and prompting the screen to display the first and second elements at separate times.

In another aspect of the invention, the first element is advertising information.

In another aspect of the invention, the terminal includes a timer which can be reset by the control unit and outputs a time base signal to the control unit, wherein when a predetermined time period has elapsed, the control unit prompts the screen to change between display of the first element and display of the second element on the basis of the time base signal.

In yet another aspect of the invention, the terminal includes a key sensor configured for detecting actuation of a key associated with the terminal, where, when the key is actuated, the control unit prompts the screen to change between display of the first element and display of the second element.

In another aspect of the invention, the terminal includes a position sensor configured for detecting a change in the position of the terminal, where, when a change in the position of the terminal is detected, the control unit prompts the screen to change between display of the first element and display of the second element.

In another aspect of the invention, a key is provided for changing over between display of the first element and display of the second element.

In another aspect of the invention, the terminal includes a timer which can be reset by the control unit and outputs a time base signal to the control unit, wherein when a predetermined time period has elapsed, the control unit prompts the screen to change between display of the first element and display of the second element on the basis of the time base signal.

BRIEF DESCRIPTION OF THE DRAWINGS

Other advantages, features and characteristics of the present invention become clearer from the description below of an exemplary embodiment and with reference to the figures of the accompanying drawings.

FIG. 3 shows a flowchart in accordance with the present invention.

DETAILED DESCRIPTION OF THE PREFERRED EMBODIMENTS

Figure 1:
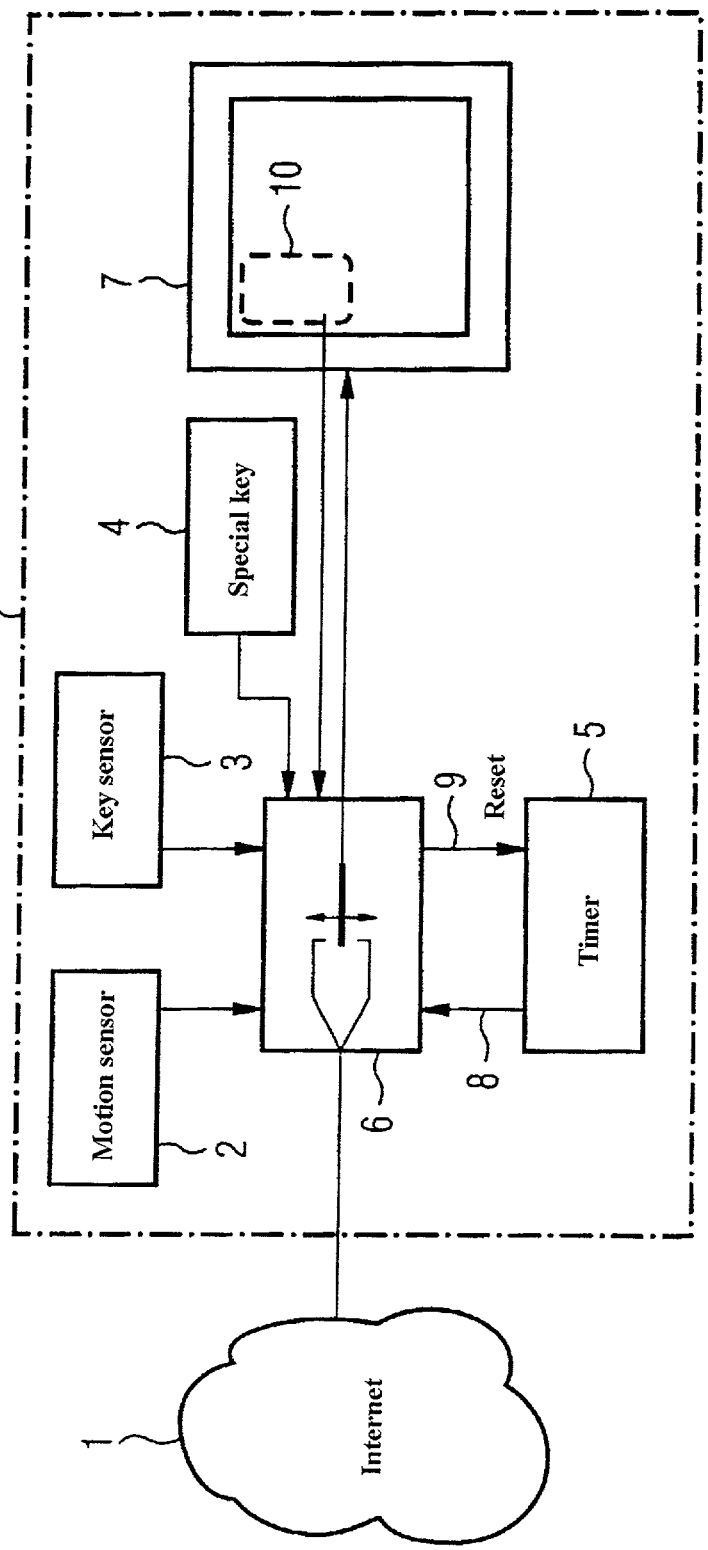
FIG. 1 shows an exemplary design of an inventive terminal.

The invention relates to the display of information from the Internet. With Internet pages, it is regularly the case that specific subareas (elements) of an Internet page display not only actual information/content but also advertising, in particular in the form of an advertising banner. In other words, the data supplied to a screen are configured such that a subarea of the screen page is configured to display an advertising banner. In other words, content information and advertising are displayed simultaneously, but in a separate space from one another, as different elements of an Internet page on the same screen page.

The invention displays screen pages which makes it possible to display advertising banners and content information on small displays as well and at the same time to improve legibility. In this regard, the invention displays different elements of a screen page at separate times instead of displaying them simultaneously in separate spaces. Thus, by way of example, advertising and other contents of an Internet page can also be displayed on small screens as a result of their being separated in time. In the case of this example, advertising banners and information are thus not displayed simultaneously next to one another on the screen, but rather are displayed at successive times.

More precisely, the present invention provides a method for displaying information on a screen. Information configured as a first element and a second element, in a separate space from the latter, for simultaneous display on the same screen page is supplied and the first element is separated from the second element. The first element and the second element are then displayed on a screen at separate times from one another.

The information may be supplied from a network, such as the Internet.

The first element may be advertising information.

The display can change between the first element and the second element after a predetermined time period has elapsed.

The display can change between the first element and the second element depending on a change of state on a terminal associated with the screen. This change of state may be actuation of a key or a change in the position of the terminal.

After the display has changed depending on a change of state, no further change may be possible during a predetermined time period, and after the time period has elapsed is there a change to the previous state.

The present invention also provides a terminal for a network, the terminal having a screen and a control unit for controlling the display on the screen. The control unit can be supplied with information configured as a first element and a second element, in a separate space from the latter, for simultaneous display on the same screen page. The control unit separates the first and second elements from one another and supplies them to the screen at separate times for display.

The terminal may have a timer which can be reset by the control unit and outputs a time base signal to the control unit. Whenever a predetermined time period has elapsed, the control unit can prompt the screen to change between display of the first element and display of the second element on the basis of the time base signal.

A key sensor may be provided for detecting actuation of a key associated with the terminal. When the key is actuated, the control unit prompts the screen to change between display of the first element and display of the second element.

The terminal may have a position sensor for detecting a change in the position of the terminal. When a change in the position of the terminal is detected, the control unit can prompt the screen to change between display of the first element and display of the second element.

In FIG. 1, a terminal based on the present invention has been provided with the reference numeral 11. The terminal has a screen (monitor) 7. This screen may, by way of example, be the display on a mobile radio. The display on the screen 7 is controlled by a control unit 6. The control unit 6 is supplied, from an information source, such as the Internet 1, with image information which is configured such that it is normally displayed on a screen in separate spaces, but simultaneously. The control unit 6 based on the present invention separates different elements of the supplied information, such as advertising banners and content information, from one another. This is shown in symbol form by a switch in the control unit 6 in FIG. 1. Different elements of a screen page which are normally displayed together on a screen page are thus supplied to the screen 7 at separate times from one another by the control unit 6.

The element (for example advertising or content) which can currently be seen on the screen 7 depends on a number of conditions. To detect these conditions, the control unit 6 has a plurality of inputs. The control unit 6 is connected by means of these inputs to a motion sensor 2, to a key sensor 3, to a special key 4 and to a timer 5. The timer 5 outputs a time base signal 8 to the control unit 6, while on the other hand the timer 5 can be reset 9 from the control unit 6 using a reset input.

Figure 2:
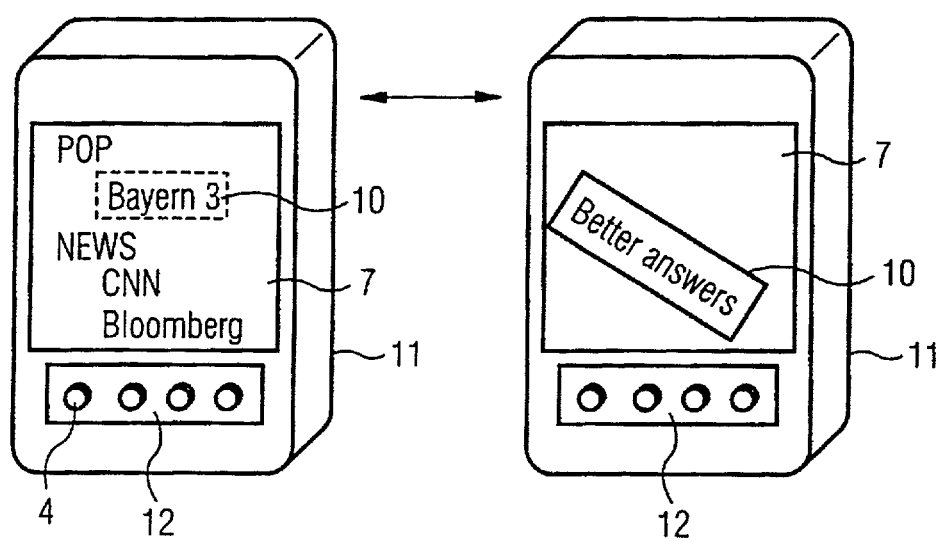
FIG. 2 shows the change between two different display modes.

FIG. 2 shows an inventive terminal 11 in different operating states. The outside of the terminal has a screen (display) 7. The user can use a keypad 12 containing a plurality of keys to manipulate the terminal 11. Alternatively or in addition, a touch-sensitive area 10 may be provided on the screen 7 in addition to the keys 12. In the content display mode (left-hand image in FIG. 2), the touch-sensitive area can be selected such that touching this area 10 automatically goes to a link address shown by the display on the area 10.

In the advertising display mode shown in the right-hand image in FIG. 2, part of the advertisement may be in the form of a touch-sensitive area 10, so that touching the advertising display (area 10) allows other information, such as the home page of the advertiser, to be selected.

One of the keys 12 may be a special key 4 making it possible to switch between the two display modes shown in FIG. 2. As FIG. 2 shows, the fact that different elements of the screen page, such as advertising information and content information, are now displayed at separate times from another allows clear and more comprehensible display. In addition, the user can concentrate on either advertising or content.

As already mentioned, the changeover between the different display modes takes place, as shown in FIG. 2, either by virtue of direct actuation of the special key 4 or by virtue of various changes of state being detected, as will be explained below with reference to the flowchart shown in FIG. 3.

When the terminal 11 is in a quiescent state, either advertising is displayed constantly (ST1) or, alternatively, the terminal switches cyclically. That is, after a predetermined time period detected by the timer 5 has elapsed between the advertising display mode and the content display mode. In this context, ST2 continuously detects whether a key has been actuated. This is done using the key sensor 3. In this case, the key sensor 3 may monitor not only the actual keys 12 but also the appropriate touch-sensitive areas 10 on the monitor 7.

If no key actuation is detected in ST2, the invention ascertains whether there is a change in position (for example rotation of the terminal 11 from the horizontal into the vertical). This is done using the motion/position sensor 2. If neither actuation of a key nor a change in position has been ascertained in ST2 and ST3, the process returns to ST1 and the appropriate information is displayed.

If either actuation of a key or a change in position has been ascertained in ST2 and ST3, ST4 displays the content information. That is, the other element of the screen page information. This corresponds to the left-hand image in FIG. 2. At the same time as the content starts to be displayed in ST4, the timer 5 is reset in a ST5. This is done using a reset input 9 on the timer 5. ST6 continuously monitors whether the time base signal 8 output by the timer 5 already indicates a time period greater than a predetermined time period $T_{thr}$. So long as this predetermined time period has not yet been ascertained on the basis of the detection in ST6, the content information continues to be displayed. As soon as the time period has been exceeded, the process automatically returns to ST1 and the advertising or cyclically changing advertising/content is displayed.

Thus, in accordance with the invention, advertising banners and content information, for example, are not displayed simultaneously next to one another on a screen, but rather are arranged at successive times (separately from one another). In the normal state, when the terminal is not being used, advertising banners are displayed on the terminal's display, which is very small, for example. Touching a key on the terminal, such as a chock dial, automatically changes the display to the actual content of the Internet page (see left-hand image in FIG. 2). If the control elements on the terminal are not used again for some time, advertising banners automatically reappear on the screen. The timer may, of course, also be reset if another change in position or actuation of a key occurred while the content information was being displayed in step ST4.

Changeover between advertising banner and other information contents may also be effected by a change in the position or movement of the terminal. An additional control key (hardware or touch-sensitive area on the screen 7) which is only active when an advertising banner is displayed on the screen may also be provided. Pressing the key, which is active only intermittently, then triggers other information relating to the advertising banner or other actions.

The invention claimed is:

1. A method for displaying information, comprising:
receiving, from an information source, at a first network device having a first display format for displaying information, a plurality of data including a first element and a second element configured for simultaneous display on a second network device having a second display format for displaying information larger than the first display format, the plurality of data defining a screen page according to the second display format;
after receiving the plurality of data but prior to displaying any of the received data, the first network device separating the received data into at least the first element and the second element, wherein the separation is based on the first element being of a first type and the second element being of a second type;
upon separating the received data, automatically displaying only one or more elements of the first type at the first network device in the first display format;
detecting a first trigger at a controller on the first network device;
based at least on the detecting of the trigger, switching from displaying only the elements of the first type in the first display format to displaying only one or more elements of the second type in the first display format;
responsive to switching from displaying the elements of the first type to displaying the elements of the second type, starting a timer having a preset duration;
if a subsequent trigger is detected at the controller before the timer expires, continuing to display the elements of the second type and resetting the timer; and
if the timer expires without detecting a subsequent trigger at the controller, automatically switching from displaying the elements of the second type in the first display format back to displaying the elements of the first type in the first display format.

2. The method as claimed in claim 1, wherein the first element is advertising information.

3. The method as claimed in claim 1, wherein the trigger comprises an elapse of a predetermined time period.

4. The method as claimed in 1, wherein the trigger comprises a state of a terminal associated with the screen.

5. The method as claimed in claim 1, wherein the trigger comprises a key actuation or an actuation at the screen.

6. A terminal for a network, comprising:
a screen; and
a control unit coupled to the screen, wherein the control unit is configured to:
receive, from an information source, at the terminal, the terminal having a screen with a first display format, a plurality of data including first and second data configured for simultaneous display on a second network device having a second display format larger than the terminal, the plurality of data defining a screen page according to the second display format;
separate the first and the second data at the terminal after reception of the plurality of data defining the screen page but prior to displaying any of the first and second data, wherein the separation is based on the first data being of a first type and the second data being of a second type;
upon separating the first and second data, automatically display only data of the first type on the screen with the first display format;
detect a first trigger;
based at least on the detected trigger, switch from displaying only data of the first type to displaying only data of the second type on the screen with the first display format;
responsive to switching from displaying only data of the first type to displaying only data of the second type, start a timer having a preset duration;
if a subsequent trigger is detected before the timer expires, continuing to display only data of the second type on the screen with the first display format and resetting the timer; and
if the timer expires without detecting a subsequent trigger at the controller, automatically switch from displaying only data of the second type on the screen with the first display format back to displaying only data of the first type on the screen with the first display format.

7. The terminal as claimed in claim 6, wherein the first data is advertising information.

8. The terminal as claimed in claim 6, further comprising a timer configured to output a time base signal to the control unit when a predetermined time period has elapsed, and wherein the control unit is configured to change a display of only data of the first type to a display of only data of the second type or change a display of only data of the second type to a display of only data of the first type.

9. The terminal as claimed in claim 6, further comprising:
a key sensor configured for detecting actuation of a key associated with the terminal, and wherein the control unit is configured to change a display of only data of the first type to a display of only data of the second type or change a display of only data of the second type to a display of only data of the first type when they key is actuated.

10. The terminal as claimed in claim 6, further comprising:
a position sensor configured for detecting a change in the position of the terminal, and wherein the control unit is configured to change a display of only data of the first type to a display of only data of the second type or change a display of only data of the second type to a display of only data of the first type when a change of the position of the terminal is detected.

11. The terminal as claimed in claim 6, wherein said screen has a small area that would become overloaded or illegible if all of said data of said first and second types were displayed simultaneously.

12. A method for displaying information on a screen, wherein the screen has a limited display area, comprising:
receiving at a device associated with the screen, from an information source, a plurality of data configured for simultaneous display on a second screen having a less limited display area, wherein a simultaneous display of the plurality of data on said screen would cause the display to become overloaded or illegible due to the limited display area, the plurality of data defining a screen page for display on the second screen;
after receiving the plurality of data defining the screen page and comprising at least first and second display information to be displayed simultaneously on said screen but prior to displaying any of the received data, the device separating the received data into a plurality of elements, including a first element representative of said first display information and a second element representative of said second display information, wherein the device separates the received data based on the first element being of a first type and the second element being of a second type;
upon separating the received data, automatically displaying only one or more elements of the first type on the screen;
detecting a first trigger at a controller on the device;
based at least on the detecting of the trigger, switching from displaying only the elements of the first type to displaying only one or more elements of the second type on the screen;
responsive to switching from displaying the elements of the first type to displaying the elements of the second type, starting a timer having a preset duration;
if a subsequent trigger is detected at the controller before the timer expires, continuing to display the elements of the second type and resetting the timer; and
if the timer expires without detecting a subsequent trigger at the controller, automatically switching from displaying the elements of the second type on the screen back to displaying the elements of the first type on the screen.

13. The method as claimed in claim 12, wherein the first element is advertising information.

14. The method as claimed in claim 12, wherein the trigger comprises an elapse of a predetermined time period.

15. The method as claimed in claim 12, wherein the trigger comprises a state of a terminal associated with the screen.

16. The method as claimed in claim 12, wherein the trigger comprises a key actuation or an actuation at the screen.

17. A method for displaying information, comprising:
receiving, from an information source, at a first network device having a first display format, a plurality of data including a first element and a second element configured for simultaneous display on a second network device having a second display format larger than the first display format, the plurality of data defining a screen page according to the second display format;
after receiving the plurality of data defining the screen page at the first network device but prior to displaying any of the received data at the first network device, the first network device separating the received data into at least the first element and the second element, wherein the separation is based on the first element being of a first type and the second element being of a second type;
upon separating the received data, the first network device automatically displaying only one or more elements of the first type;
detecting a first trigger at a controller on the first network device;
based at least on the detecting of the trigger at the first network device, switching from displaying only the elements of the first type at the first network device to displaying only the elements of the second type at the first network device.

18. The method as claimed in claim 1, wherein the first type corresponds to advertising elements and the second type corresponds to content elements.

* * * * *